United States Patent
Chakiachvili et al.

(10) Patent No.: US 7,845,186 B2
(45) Date of Patent: Dec. 7, 2010

(54) VEHICLE GASKET FOR INTEGRATED TRANSPORT REFRIGERATION UNIT

(75) Inventors: Bruno Chakiachvili, Beligneux (FR); Gilles Donnat, Caluire et Cuire (FR)

(73) Assignee: Carrier Corporation, Farmington, CT (US)

( * ) Notice: Subject to any disclaimer, the term of this patent is extended or adjusted under 35 U.S.C. 154(b) by 416 days.

(21) Appl. No.: 12/091,182

(22) PCT Filed: Jan. 12, 2006

(86) PCT No.: PCT/US2006/001158

§ 371 (c)(1), (2), (4) Date: Apr. 23, 2008

(87) PCT Pub. No.: WO2007/081338

PCT Pub. Date: Jul. 19, 2007

(65) Prior Publication Data

US 2008/0223060 A1    Sep. 18, 2008

(51) Int. Cl.
*B60H 1/32* (2006.01)
(52) U.S. Cl. .................. 62/244; 62/DIG. 16; 454/136; 277/654
(58) Field of Classification Search .................. 62/244, 62/DIG. 16; 277/654; 454/136–138
See application file for complete search history.

(56) References Cited

U.S. PATENT DOCUMENTS

| | | | |
|---|---|---|---|
| 2,665,625 A | 1/1954 | Woodhams | |
| 3,680,468 A | 8/1972 | Schueler | |
| 4,608,834 A * | 9/1986 | Rummel | 62/244 |
| 4,795,174 A | 1/1989 | Whitlow | |
| 4,982,583 A | 1/1991 | Matsuda et al. | |
| 5,862,674 A * | 1/1999 | Ichishi et al. | 62/186 |
| 5,935,695 A | 8/1999 | Baerveldt | |
| 2005/0077683 A1 | 4/2005 | Comert et al. | |

FOREIGN PATENT DOCUMENTS

| | | |
|---|---|---|
| DE | 3138183 A1 | 8/1982 |
| EP | 1308330 A1 | 5/2003 |
| JP | 11170927 | 6/1999 |

OTHER PUBLICATIONS

Chinese Office Action dated Sep. 4, 2009.
International Preliminary Report on Patentability mailed on Jul. 24, 2008.
Extended European Search Report dated Feb. 8, 2010 for EP 06718252.7.
Search Report PCT/US06/01158.

* cited by examiner

*Primary Examiner*—William E. Tapolcai
(74) *Attorney, Agent, or Firm*—Carlson, Gaskey & Olds

(57) ABSTRACT

A refrigeration unit includes an external housing located primarily outside of a vehicle compartment of a vehicle, and an internal housing located primarily inside of the vehicle compartment. A vehicle roof of the compartment has an external layer and an internal layer spaced apart from the external layer with insulation located there between. The vehicle roof includes an opening that receives the refrigeration unit. A gasket provides a seal between the refrigeration unit and the vehicle roof. The gasket covers the exterior layer and the interior layer. The gasket is formed of multiple layers of material which are secured to one another.

17 Claims, 2 Drawing Sheets

VEHICLE GASKET FOR INTEGRATED TRANSPORT REFRIGERATION UNIT

BACKGROUND OF THE INVENTION

The invention relates generally to a gasket for sealing a transport refrigeration unit located within a vehicle. More particularly, the invention relates to a gasket for sealing an opening in a vehicle that receives the transport refrigeration unit.

Conventional transport refrigeration units provide cooling inside a vehicle compartment. The conventional transport refrigeration units are typically located on a vehicle roof within a refrigeration unit housing. The transport refrigeration unit cools air that is pumped into the vehicle compartment to provide cooling. The components produce heat and vent within the refrigeration unit housing. The vehicle roof acts as an insulator to protect the vehicle interior from the heat produced by the refrigeration unit. Locating the refrigeration unit housing on the vehicle roof is unsightly.

It would be desirable to locate the refrigeration unit within the vehicle compartment to hide the refrigeration unit components from external view. However, external air must be able to reach the refrigeration unit components within the vehicle to provide cooling. If the refrigeration unit is located within the vehicle, an opening must be provided in the vehicle to allow the refrigeration unit to be located within the vehicle compartment and provide access to the external air for cooling. However, the opening in the vehicle can allow air and water to enter the vehicle and the refrigeration unit.

Therefore, an arrangement for sealing an opening in a vehicle that receives a transport refrigeration unit while providing external air to the refrigeration unit components is needed.

SUMMARY OF THE INVENTION

In the present invention, a vehicle roof supports a refrigeration unit. The refrigeration unit includes an external housing located primarily outside of a vehicle compartment and an internal housing located primarily inside of the vehicle compartment. The internal housing is located within an opening in the vehicle roof. The vehicle roof has an external layer and an internal layer spaced apart from the external layer. Insulation is placed between the external layer and the internal layer to insulate the vehicle compartment from external air.

A gasket is located between the refrigeration unit and the vehicle roof to seal the opening. The gasket extends from a top side of the vehicle roof to the bottom side of the vehicle roof to cover the exterior layer and the interior layer. The gasket is formed of multiple layers of material with are secured to one another. An aluminum layer is secured to the butyl layer, and a butyl layer is located adjacent to the vehicle roof. The butyl layer acts as an adhesive to attach the aluminum to the vehicle roof. The aluminum layer is adjacent to the internal housing when the refrigeration unit is assembled into the opening. The aluminum layer prevents ingress of water, air, and other contaminants into the vehicle roof through the opening.

These and other features of the present invention can be best understood from the following specification and drawings, the following of which is a brief description.

DETAILED DESCRIPTION OF THE PREFERRED EMBODIMENT

Figure 1:
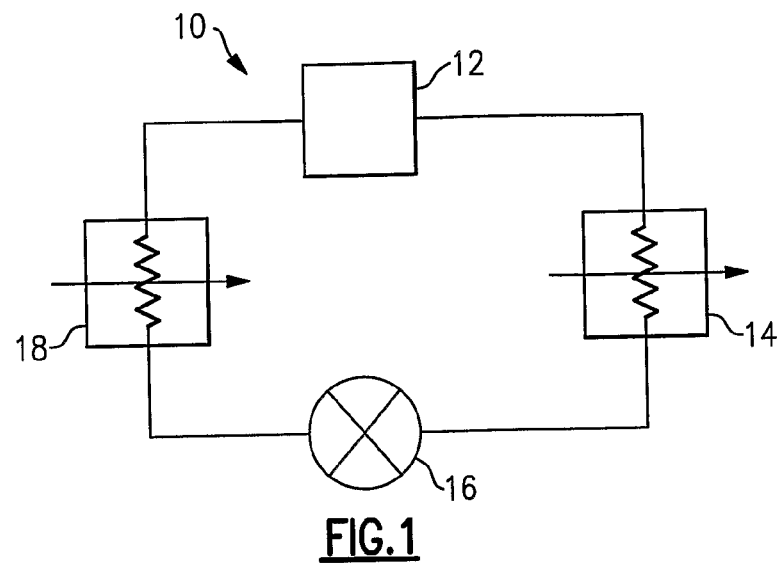
FIG. 1 is a schematic view of a vapor compression system of the present invention.

FIG. 1 illustrates a vapor compression system 10, such as a refrigeration system, including a compressor 12 that compresses a fluid, such as refrigerant. From the compressor 12, the refrigerant is delivered downstream to a heat exchanger, such as a condenser 14. In the condenser 14, the refrigerant rejects heat to an external fluid medium. In the embodiment shown, the external fluid medium is air. From the condenser 14, the refrigerant travels to an expansion device 16 and is expanded to a low pressure. The refrigerant accepts heat from another fluid medium, such as air, in an evaporator 18 and then flows to the compressor 12, completing the cycle.

Figure 2:
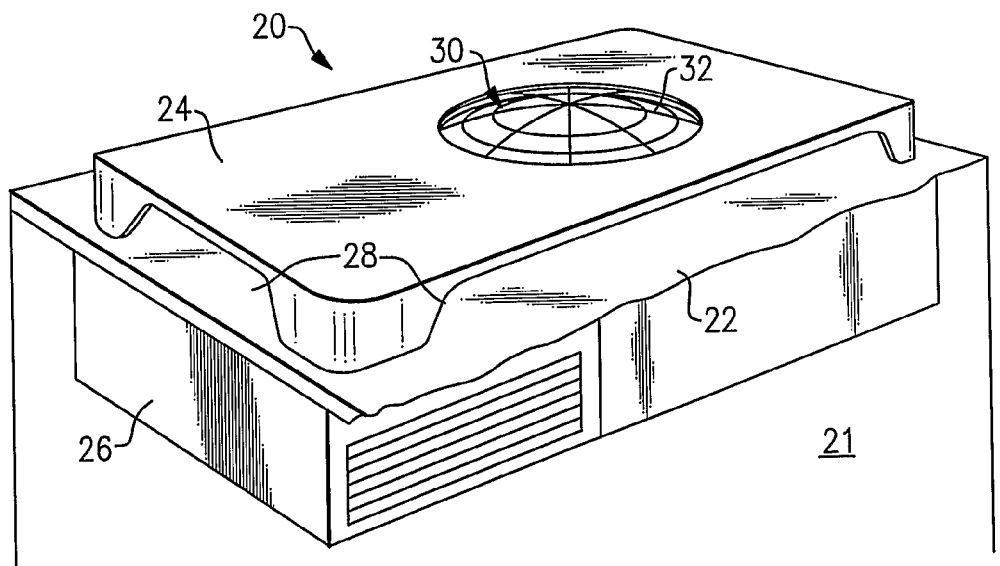
FIG. 2 shows a perspective view of a refrigeration unit of the present invention.

FIG. 2 shows a perspective view of a refrigeration unit 20 of the present invention including the vapor compression system 10. A vehicle roof 22 supports the refrigeration unit 20. The refrigeration unit 20 includes an external housing 24 and an internal housing 26. The external housing 24 is located primarily outside a vehicle compartment 21 and above the vehicle roof 22. The internal housing 26 is located primarily inside of the vehicle compartment 21 and under the vehicle roof 22, as shown. External air enters the external housing 24 through a first opening 28 located between the vehicle roof 22 and the external housing 24. As shown, the refrigeration unit 20 can include multiple first openings 28 to increase the airflow into the refrigeration unit 20. The air passes over the components of the refrigeration unit 20, such as the condenser 14 and the compressor 12, and is heated. The now heated air exits through a second opening 30 in the external housing 24. A cover 32 may be located at the second opening 30 to reduce the amount of water and other external contaminants that may enter the refrigeration unit 20 through the second opening 30. Additionally, the external housing 24 also assists in preventing water and other external contaminants from entering the refrigeration unit 20.

By discharging air outside of the vehicle compartment 21 to remove heat from the components of the vapor compression system 10, the refrigeration unit 20 can be located within the vehicle compartment 21 and under the vehicle roof 22 without heating the vehicle compartment 21, and is therefore less unsightly. The refrigeration unit 20 is hidden from external view, any heat generated by the components is removed through the second opening 30 without affecting the temperature of the air in the vehicle compartment 21.

Figure 3:
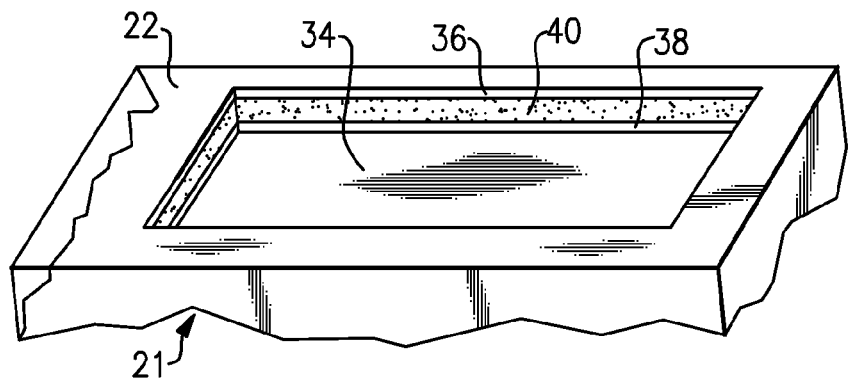
FIG. 3 is a perspective view of an opening in a vehicle compartment for receiving the refrigeration unit.

FIG. 3 shows the vehicle roof 22 including an opening 34 for receiving the internal housing 26 of the refrigeration unit 20. The vehicle roof 22 includes an external layer 36 and an internal layer 38. The internal layer 38 is spaced apart from the external layer 36. Insulation 40 is located between the external layer 36 and the internal layer 38. The external layer 36, the internal layer 38 and the insulation 40 insulate the vehicle compartment 21 from the external air and the outside air. Thus, when the refrigeration unit 20 is operating, the vehicle compartment 21 remains cool. However, the opening 34 in the vehicle roof 22 can allow air, water and other external contaminants to reach the insulation 40, the interior layer 38 and the vehicle compartment 21. The air, the water and other contaminants can cause leakage or rusting. Thus, the opening 34 must be sealed.

Figure 4:
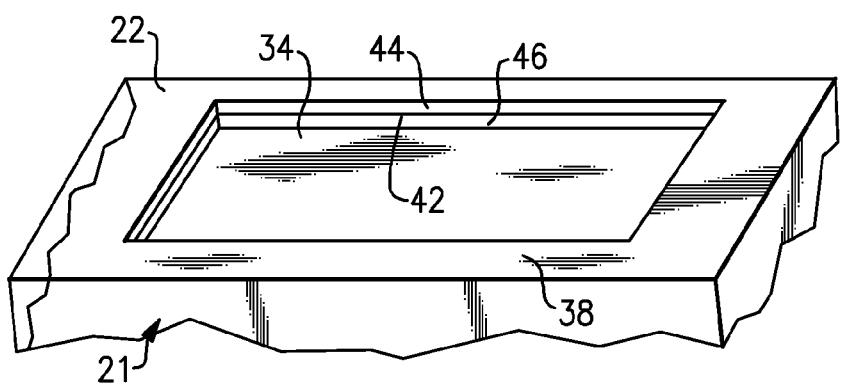
FIG. 4 is a perspective view of the opening in a vehicle compartment sealed by a gasket of the present invention.

FIG. 4 shows the opening 34 in the vehicle roof 22 sealed by a vehicle gasket 42. The gasket 42 extends from a top edge 23 of the vehicle roof 22 to the bottom edge 25 of the interior layer 38 of the vehicle roof 22 covering and sealing both the exterior layer 36 and the interior layer 38. The width of the gasket 42 can be modified for each vehicle as the space between the exterior layer 36 and the interior layer 38 varies, changing the overall distance from the top edge of the vehicle roof 22 to the bottom edge of the vehicle roof 22.

Figure 5:
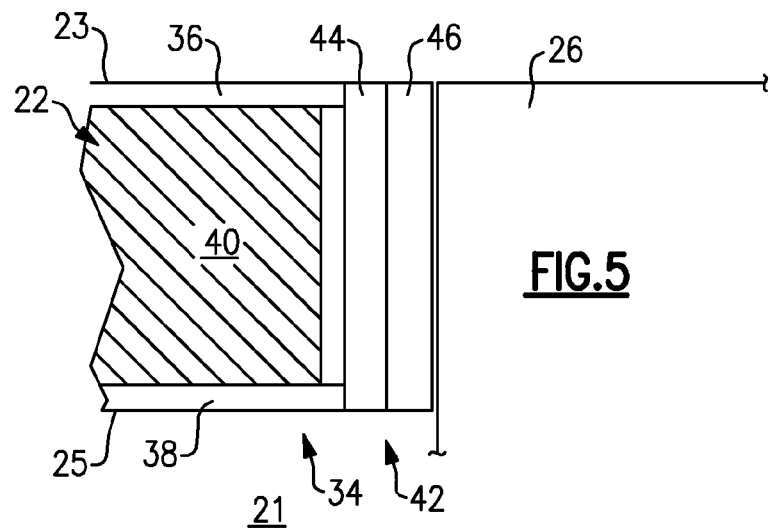
FIG. 5 shows a cross-section of a vehicle roof, the gasket and an internal housing.

FIG. 5 shows a cross-section of the vehicle roof 21, the gasket 42 and the internal housing 26. The aluminum layer 46 is formed of multiple layers of material with are secured to one another. The aluminum layer 46 is secured to the butyl layer 44 and the butyl layer 44 is located adjacent to the vehicle roof 22. The butyl layer 44 acts as an adhesive to attach the gasket 42 to the vehicle roof 22 and to assist in sealing against water and air ingress. The aluminum layer 46 is adjacent to the internal housing 26 when the refrigeration unit 20 is assembled into the opening 34. The aluminum layer 46 prevents ingress of water, air, and other contaminants into the vehicle roof 22 through the opening 34 to prevent corrosion of the vehicle roof 22. The aluminum layer 46 is preferably thin enough to allow for some deformation and shaping of the gasket 42. The aluminum layer 46 and the internal housing 26 have an interference fit to aid in sealing the vehicle roof 22 and the vehicle compartment 21. The butyl layer 44 acts as an elastomeric and a gasket to assist in sealing the opening 34.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigeration unit for a vehicle comprising:
an external housing located primarily outside a vehicle compartment;
an internal housing is located primarily inside the vehicle compartment, wherein the external housing and the internal housing house a plurality of components;
an opening in a vehicle roof of the vehicle to receive the internal housing; and
a gasket located between the roof and the internal housing, wherein the gasket comprises multiple layers secured to one another, wherein the gasket comprises a butyl layer adjacent to the vehicle roof and an aluminum layer adjacent to the internal housing.

2. The refrigeration unit of claim 1, wherein the gasket is adhered to the vehicle roof.

3. The refrigeration unit of claim 1, wherein the vehicle roof includes an exterior layer and an interior layer spaced from the exterior layer, and wherein insulation is located between the exterior layer and the interior layer.

4. The refrigeration unit of claim 1, wherein the plurality of components includes an evaporator, a condenser, and a compressor.

5. The refrigeration unit of claim 1, wherein the plurality of components are located under the vehicle roof and in the vehicle compartment.

6. The refrigeration unit of claim 5, wherein the external housing includes an airflow opening to allow air to reach the plurality of components.

7. A refrigeration unit for a vehicle comprising:
an external housing located primarily outside a vehicle compartment;
an internal housing is located primarily inside the vehicle compartment, wherein the external housing and the internal housing house a plurality of components;
an opening in a vehicle roof of the vehicle to receive the internal housing; and
a gasket located between the roof and the internal housing, wherein the gasket comprises multiple layers secured to one another,
wherein the vehicle roof includes an exterior layer and an interior layer spaced from the exterior layer, and insulation is located between the exterior layer and the interior layer, and
wherein the vehicle roof includes a top edge and a bottom edge and the gasket extends from the top edge of the vehicle roof to the bottom side of the vehicle edge to cover the exterior layer and the interior layer.

8. The refrigeration unit of claim 7, wherein the gasket is adhered to the vehicle roof.

9. The refrigeration unit of claim 7, wherein the plurality of components includes an evaporator, a condenser, and a compressor.

10. The refrigeration unit of claim 7, wherein the plurality of components are located under the vehicle roof and in the vehicle compartment.

11. The refrigeration unit of claim 10, wherein the external housing includes an airflow opening to allow air to reach the plurality of components.

12. A gasket for a vehicle comprising:
a first layer located adjacent to a vehicle roof; and
a second layer secured to the first layer located adjacent to a refrigeration unit located in the vehicle roof, wherein the first layer comprises a butyl material and the second layer comprises an aluminum material.

13. The gasket of claim 12, wherein the first layer adheres to the vehicle roof.

14. The gasket of claim 12, wherein the vehicle roof includes an exterior layer and an interior layer spaced from the exterior layer, and wherein insulation is located between the exterior layer and the interior layer.

15. A gasket for a vehicle comprising:
a first layer located adjacent to a vehicle roof; and
a second layer secured to the first layer located adjacent to a refrigeration unit located in the vehicle roof,
wherein the vehicle roof includes an exterior layer and an interior layer spaced from the exterior layer, and insulation is located between the exterior layer and the interior layer, and
wherein the vehicle roof includes a top edge and a bottom edge and the gasket extends from the top edge to the bottom edge to cover the exterior layer and the interior layer.

16. The gasket of claim 15, wherein the first layer adheres to the vehicle roof.

17. The gasket of claim 15, wherein the vehicle roof includes an exterior layer and an interior layer spaced from the exterior layer, and wherein insulation is located between the exterior layer and the interior layer.

* * * * *